United States Patent
Rathore

(10) Patent No.: US 10,597,557 B2
(45) Date of Patent: *Mar. 24, 2020

(54) CURABLE SILSESQUIOXANE POLYMERS, COMPOSITIONS, ARTICLES, AND METHODS

(71) Applicant: 3M INNOVATIVE PROPERTIES COMPANY, St. Paul, MN (US)

(72) Inventor: Jitendra S. Rathore, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 149 days.

This patent is subject to a terminal disclaimer.

(21) Appl. No.: 15/878,661

(22) Filed: Jan. 24, 2018

(65) Prior Publication Data

US 2018/0148602 A1 May 31, 2018

Related U.S. Application Data

(62) Division of application No. 13/906,687, filed on May 31, 2013, now abandoned.

(60) Provisional application No. 61/740,590, filed on Dec. 21, 2012.

(51) Int. Cl.
  *C09D 183/04* (2006.01)
  *C08G 77/20* (2006.01)
  *C08G 77/04* (2006.01)

(52) U.S. Cl.
  CPC .......... *C09D 183/04* (2013.01); *C08G 77/04* (2013.01); *C08G 77/20* (2013.01); *C08L 2312/08* (2013.01); *Y10T 428/31663* (2015.04)

(58) Field of Classification Search
  CPC .......... C09D 183/04; B05D 1/00; C23C 16/48
  See application file for complete search history.

(56) References Cited

U.S. PATENT DOCUMENTS

| | | | |
|---|---|---|---|
| 4,822,828 A | 4/1989 | Swofford |
| 5,047,492 A | 9/1991 | Weidner |
| 5,484,867 A | 1/1996 | Lichtenhan |
| 5,609,925 A | 3/1997 | Camilletti |
| 5,755,867 A | 5/1998 | Chikuni |
| 5,981,670 A | 11/1999 | Itoh |
| 6,770,726 B1 | 8/2004 | Arkles |
| 7,241,437 B2 | 7/2007 | Davidson |
| 8,431,670 B2 | 4/2013 | Allen |
| 2003/0055193 A1 | 3/2003 | Lichtenhan |
| 2004/0047988 A1 | 3/2004 | Lee |
| 2005/0215807 A1 | 9/2005 | Morimoto |
| 2007/0128370 A1* | 6/2007 | Takada ................ C09D 183/04 427/387 |
| 2008/0286467 A1 | 11/2008 | Allen |
| 2009/0005479 A1 | 1/2009 | Ou |
| 2011/0045387 A1 | 2/2011 | Allen |
| 2011/0048787 A1 | 3/2011 | Allen |
| 2011/0083887 A1 | 4/2011 | Brock |
| 2011/0160330 A1 | 6/2011 | Nagai |
| 2012/0003437 A1 | 1/2012 | Wada |

FOREIGN PATENT DOCUMENTS

| | | |
|---|---|---|
| WO | WO 2009/085926 | 7/2009 |
| WO | WO 2009/091440 | 7/2009 |
| WO | WO 2014/099562 | 6/2014 |

OTHER PUBLICATIONS

Abe et al., "Preparation and Properties of Silicon-containing Hybrid Gels from Vinyltrimethoxysilane," *Journal of Non-Crystalline Solids*, 1992; 147 & 148:47-51.
Baney et al., "Silsesquioxanes", Chem. Rev. 1995, 95, 1409-1430.
Gelest "Reactive Siliones: Forging New Polymer Lines", Silsesquioxanes, pp. 45-49 [undated, believed to have been published more than 1 year prior to the filing of this application].
Shin et al., "Surface Properties of Silica Nanoparticles Modified with Polymers for Polymer Nanocomposite Applications" Journal of Industrial and Engineering Chemistry 14 (2008) 515-519.
International Search Report PCT/US2013/075237; dated Jan. 30, 2014, 4 pgs.

* cited by examiner

*Primary Examiner* — Dah-Wei D. Yuan
*Assistant Examiner* — Kristen A Dagenais-Englehart
(74) *Attorney, Agent, or Firm* — Carolyn A. Fischer

(57) ABSTRACT

A curable silsesquioxane polymer, a composition including such polymer, an article having a layer disposed thereon that includes the curable polymer and/or the cured polymer, and a method of forming a cured coating, wherein the curable silsesquioxane polymer includes a three-dimensional branched network having the formula:

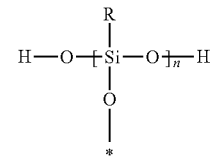

wherein: the oxygen atom at the * is bonded to another Si atom within the three-dimensional branched network; R is an organic group comprising an ethylenically unsaturated group; n is an integer of greater than 3; and the —OH groups are present in an amount of at least 15 wt-% of the polymer.

8 Claims, No Drawings

CURABLE SILSESQUIOXANE POLYMERS, COMPOSITIONS, ARTICLES, AND METHODS

CROSS REFERENCE TO RELATED APPLICATIONS

This application is a divisional of U.S. application Ser. No. 13/906,687, filed May 31, 2013, now pending, which claims the benefit of U.S. Provisional Application No. 61/740,590, filed Dec. 21, 2012, the disclosure of which is incorporated by reference in its/their entirety herein.

BACKGROUND

Hard coatings can generally be defined as clear coatings that provide protection against abrasion and scratch when applied to relatively softer substrates. In addition to the abrasion and scratch-resistance, excellent durability is also desired. In general, hard-coats can be prepared by mixing silica nanoparticles with a base polymer, for example, an epoxy- or acrylate-based polymer. The major drawback for some epoxy- or acrylate-based coatings is poor outdoor weatherability. Thus, new polymers are needed that have better outdoor weatherability and that can be used to prepare hard coats.

SUMMARY

The present disclosure provides a curable silsesquioxane polymer, a composition including such polymer, an article having a layer disposed thereon that includes the curable polymer and/or the cured polymer, and a method of forming a cured coating. Such silsesquioxane (SSQ) polymers can have excellent outdoor weatherability, as well as desirable UV and moisture resistance properties.

In one embodiment, the present disclosure provides a curable silsesquioxane polymer that includes a three-dimensional branched network having the formula:

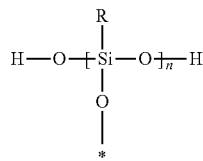

wherein: the oxygen atom at the * is bonded to another Si atom within the three-dimensional branched network; R is an organic group comprising an ethylenically unsaturated group; n is an integer of greater than 3; and the —OH groups are present in an amount of at least 15 wt-% of the polymer.

In one embodiment, the present disclosure provides a curable silsesquioxane polymer that includes a three-dimensional branched network which is a condensation reaction product of a compound having the formula Z—Y—Si($R^1$)$_3$, wherein: Y is a bond, an alkylene group, an arylene group, or a combination thereof; Z is an ethylenically unsaturated group selected from a vinyl group, a vinylether group, a (meth)acryloyloxy group, and a (meth)acryloylamino group; and each $R^1$ group is independently a hydrolyzable group; wherein the polymer includes —OH groups in an amount of at least 15 wt-% of the polymer.

In one embodiment, the present disclosure provides a curable composition that includes a photoinitiator (e.g., a free-radical initiator) and a curable silsesquioxane polymer of the present disclosure. In certain embodiments, the curable composition can optionally include nanoparticles. In certain embodiments, the curable composition can optionally include an organic solvent.

In one embodiment, the present disclosure provides an article that includes a substrate and a curable composition of the present disclosure in a layer disposed on at least a portion of at least one surface of the substrate.

In one embodiment, the present disclosure provides an article that includes a substrate and a cured coating layer prepared by UV curing a curable composition of the present disclosure disposed on at least a portion of at least one surface of the substrate.

In one embodiment, the present disclosure provides a method of making a cured coating on a substrate surface. The method includes: coating a curable composition of the present disclosure on at least a portion of at least one substrate surface; optionally exposing the coated curable composition to conditions that allow an organic solvent, if present, to evaporate from the curable composition; and UV curing the curable composition.

As used herein, the term "organic group" means a hydrocarbon group (with optional elements other than carbon and hydrogen, such as oxygen, nitrogen, sulfur, silicon, and halogens) that is classified as an aliphatic group, cyclic group, or combination of aliphatic and cyclic groups (e.g., alkaryl and aralkyl groups). In the context of the present invention, the organic groups are those that do not interfere with the formation of curable silsesquioxane polymer. The term "aliphatic group" means a saturated or unsaturated linear or branched hydrocarbon group. This term is used to encompass alkyl, alkenyl, and alkynyl groups, for example. The term "alkyl group" is defined herein below. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" are defined herein below. The term "heterocyclic group" means a closed ring hydrocarbon in which one or more of the atoms in the ring is an element other than carbon (e.g., nitrogen, oxygen, sulfur, etc.). The organic group can have any suitable valency but is often monovalent or divalent.

The term "alkyl" refers to a monovalent group that is a radical of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Examples of alkyl groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "alkylene" refers to a divalent group that is a radical of an alkane and includes groups that are linear, branched, cyclic, bicyclic, or a combination thereof. Unless otherwise indicated, the alkylene group typically has 1 to 30 carbon atoms. In some embodiments, the alkylene group has 1 to 20 carbon atoms, 1 to 10 carbon atoms, 1 to 6 carbon atoms, or 1 to 4 carbon atoms. Examples of alkylene groups include, but are not limited to, methylene, ethylene, 1,3-propylene, 1,2-propylene, 1,4-butylene, 1,4-cyclohexylene, and 1,4-cyclohexyldimethylene.

The term "alkoxy" refers to a monovalent group having an oxy group bonded directly to an alkyl group.

The term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to the aromatic ring. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, and anthracyl.

The term "arylene" refers to a divalent group that is aromatic and, optionally, carbocyclic. The arylene has at least one aromatic ring. Any additional rings can be unsaturated, partially saturated, or saturated. Optionally, an aromatic ring can have one or more additional carbocyclic rings that are fused to the aromatic ring. Unless otherwise indicated, arylene groups often have 6 to 20 carbon atoms, 6 to 18 carbon atoms, 6 to 16 carbon atoms, 6 to 12 carbon atoms, or 6 to 10 carbon atoms.

The term "aralkyl" refers to a monovalent group that is an alkyl group substituted with an aryl group (e.g., as in a benzyl group). The term "alkaryl" refers to a monovalent group that is an aryl substituted with an alkyl group (e.g., as in a tolyl group). Unless otherwise indicated, for both groups, the alkyl portion often has 1 to 10 carbon atoms, 1 to 6 carbon atoms, or 1 to 4 carbon atoms and an aryl portion often has 6 to 20 carbon atoms, 6 to 18 carbon atoms, 6 to 16 carbon atoms, 6 to 12 carbon atoms, or 6 to 10 carbon atoms.

The term "aralkylene" refers to a divalent group that is an alkylene group substituted with an aryl group or an alkylene group attached to an arylene group. The term "alkarylene" refers to a divalent group that is an arylene group substituted with an alkyl group or an arylene group attached to an alkylene group. Unless otherwise indicated, for both groups, the alkyl or alkylene portion typically has from 1 to 20 carbon atoms, 1 to 10 carbon atoms, 1 to 6 carbon atoms, or 1 to 4 carbon atoms. Unless otherwise indicated, for both groups, the aryl or arylene portion typically has from 6 to 20 carbon atoms, 6 to 18 carbon atoms, 6 to 16 carbon atoms, 6 to 12 carbon atoms, or 6 to 10 carbon atoms.

The term "hydrolyzable group" refers to a group that can react with water having a pH of 1 to 10 under conditions of atmospheric pressure. The hydrolyzable group is often converted to a hydroxyl group when it reacts. The hydroxyl group often undergoes further reactions. Typical hydrolyzable groups include, but are not limited to, alkoxy, aryloxy, aralkyloxy, alkaryloxy, acyloxy, or halo. As used herein, the term is often used in reference to one of more groups bonded to a silicon atom in a silyl group.

The term "alkoxy" refers to a monovalent group having an oxy group bonded directly to an alkyl group.

The term "aryloxy" refers to a monovalent group having an oxy group bonded directly to an aryl group.

The terms "aralkyloxy" and "alkaryloxy" refer to a monovalent group having an oxy group bonded directly to an aralkyl group or an alkaryl group, respectively.

The term "acyloxy" refers to a monovalent group of the formula —O(CO)$R^b$ where $R^b$ is alkyl, aryl, aralkyl, or alkaryl. Suitable alkyl $R^b$ groups often have 1 to 10 carbon atoms, 1 to 6 carbon atoms, or 1 to 4 carbon atoms. Suitable aryl $R^b$ groups often have 6 to 12 carbon atoms such as, for example, phenyl. Suitable aralkyl and alkaryl $R^b$ groups often have an alkyl group with 1 to 10 carbon atoms, 1 to 6 carbon atoms, or 1 to 4 carbon atoms and an aryl having 6 to 12 carbon atoms.

The term "halo" refers to a halogen atom such as fluoro, bromo, iodo, or chloro. When part of a reactive silyl, the halo group is often chloro.

The term "(meth)acryloyloxy group" includes an acryloyloxy group (—O—(CO)—CH=CH$_2$) and a methacryloyloxy group (—O—(CO)—C(CH$_3$)=CH$_2$).

The term "(meth)acryloylamino group" includes an acryloylamino group (—NR—(CO)—CH=CH$_2$) and a methacryloylamino group (—NR—(CO)—C(CH$_3$)=CH$_2$) including embodiments wherein the amide nitrogen is bonded to a hydrogen, methyl group, or ethyl group (R is H, methyl, or ethyl).

The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein, in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

When a group is present more than once in a formula described herein, each group is "independently" selected, whether specifically stated or not. For example, when more than one R group is present in a formula, each R group is independently selected. Furthermore, subgroups contained within these groups are also independently selected. For example, when each R group contains a Y group, each Y is also independently selected.

As used herein, the term "room temperature" refers to a temperature of 20° C. to 25° C. or 22° C. to 25° C.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF EXEMPLARY EMBODIMENTS

The present disclosure provides curable silsesquioxane (SSQ) polymers that have excellent outdoor weatherability, as well as desirable UV and moisture resistance properties that make them good for preparing protective coatings.

In one embodiment, the present disclosure provides a curable composition that includes a photoinitiator (e.g., a free-radical initiator) and a curable silsesquioxane polymer of the present disclosure. In certain embodiments, the curable composition can optionally include nanoparticles (e.g., silica, titania, or zirconia) that can impart hardness to the coating. In certain embodiments, the curable composition can optionally include an organic solvent.

This technology can provide a weatherable silsesquioxane glass coating or hard coating that has multiple applications. For example, such coatings can be used as anti-scratch and anti-abrasion coatings for various polycarbonate lens and polyesters films, which require additional properties such as optical clarity, durability, hydrophobicity, etc., or any other application where use of temperature, radiation, or moisture may cause degradation of films.

In one embodiment, the present disclosure provides a curable silsesquioxane polymer that includes a three-dimensional branched network having the formula:

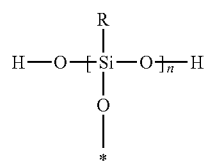

wherein the oxygen atom at the * is bonded to another Si atom within the three-dimensional branched network.

In certain embodiments of the curable silsesquioxane polymer, R is an organic group that includes an ethylenically unsaturated group. In certain embodiments of the curable silsesquioxane polymer, R has the formula —Y—Z.

In certain embodiments of the curable silsesquioxane polymer, n is an integer of greater than 3. In certain embodiments, n is an integer of at least 10. In certain embodiments, n is an integer of no greater than 100. In certain embodiments, n is an integer of no greater than 25.

In certain embodiments of the curable silsesquioxane polymer, the —OH groups are present in an amount of at least 15 wt-% of the polymer. In certain embodiments, the —OH groups are present in an amount of at least 20 wt-% of the polymer. In certain embodiments, the —OH groups are present in an amount of no greater than 60 wt-% of the polymer. In certain embodiments, the —OH groups are present in an amount of no greater than 50 wt-% of the polymer. In certain embodiments, the —OH groups are present in an amount of no greater than 30 wt-% of the polymer.

In one embodiment, the present disclosure provides a curable silsesquioxane polymer that includes a three-dimensional branched network which is a condensation reaction product of a compound having the formula $Z-Y-Si(R^1)_3$.

In certain embodiments of the R group of the curable silsesquioxane polymer and/or the reactant $Z-Y-Si(R^1)_3$, Y is a bond, an alkylene group, an arylene group, or a combination thereof. In certain embodiments, Y is a bond, a (C1-C20)alkylene group, a (C6-C12)arylene group, a (C6-C12)alk(C1-C20)arylene group, a (C6-C12)ar(C1-C20)alkylene group, or a combination thereof.

In certain embodiments of the R group of the curable silsesquioxane polymer and/or the reactant $Z-Y-Si(R^1)_3$, Z is an ethylenically unsaturated group selected from a vinyl group, a vinylether group, a (meth)acryloyloxy group, and a (meth)acryloylamino group (including embodiments wherein the nitrogen is optionally substituted with an alkyl such as methyl or ethyl). In certain embodiments, Z is a vinyl group.

In certain embodiments of the R group of the curable silsesquioxane polymer and/or the reactant $Z-Y-Si(R^1)_3$, each $R^1$ group is independently a hydrolyzable group. In certain embodiments of $R^1$, the hydrolyzable group is selected from an alkoxy, aryloxy, aralkyloxy, alkaryloxy, acyloxy, and halo. In certain embodiments of $R^1$, the hydrolyzable group is an alkoxy group.

Curable silsesquioxane polymers can be made by the condensation of reactants of the formula $Z-Y-Si(R^1)_3$. Examples of such reactants include vinyltriethoxysilane, allyltriethoxysilane, allylphenylpropyltriethoxysilane, 3-butenyltriethoxysilane, docosenyltriethoxysilane, and hexenyltriethoxysilane. Condensation of such reactants can be carried out using conventional techniques, as exemplified in the Examples Section.

Exemplary silsesquioxane polymers of the present disclosure can be made by the condensation of exemplary reactants of the formula $Z-Y-Si(R^1)_3$ as follows:

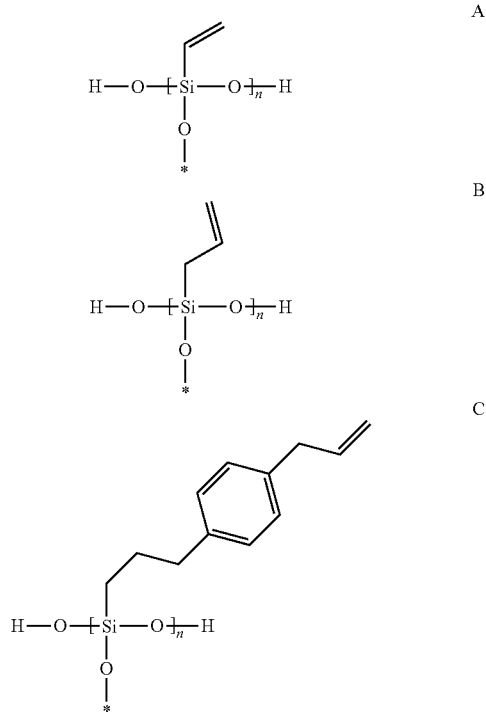

-continued

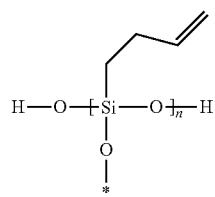

D

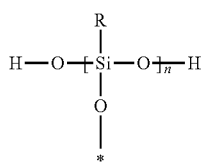

F

These polymers are poly(vinylsilsesquioxane) (A), poly(allylsilsesquioxane) (B), poly(allylphenylpropylsilsesquioxane) (C), poly(3-butenylsilsesquioxane) (D), poly(docosenyl silsesquioxane) (E), and poly(hexenylsilsesquioxane) (F).

An exemplary curable silsesquioxane polymer of the present disclosure that has the general formula:

E

F has the following more specific three-dimensional branched network structure (wherein the oxygen atom in the formula above at the * above is bonded to another Si atom within the three-dimensional branched network; R is a vinyl group; n is an integer of greater than 3; and the —OH groups are present in an amount of at least 15 wt-% of the polymer):

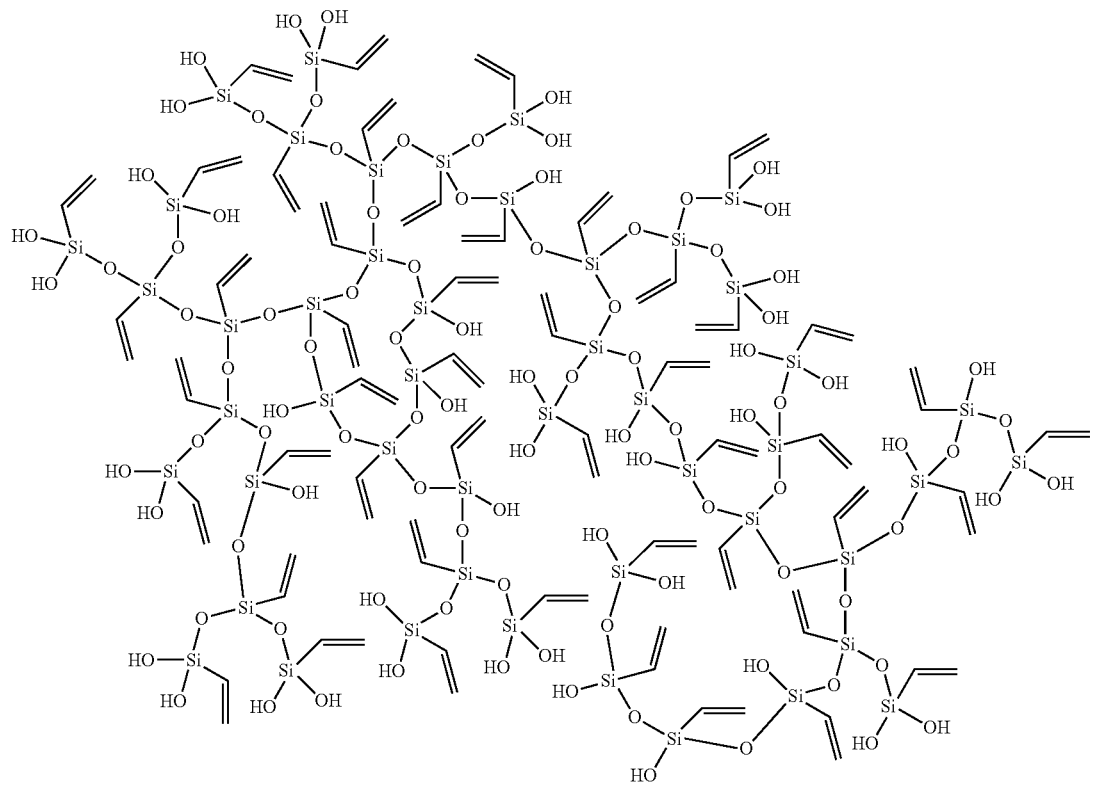

The curable silsesquioxane polymers are generally tacky, soluble in organic solvents (particularly polar organic solvents), and coatable. Thus, such curable silsesquioxane polymers can be easily processed. They can be easily applied to a substrate. They also adhere well to a variety of substrates. For example, in certain embodiments, a curable silsesquioxane polymer of the present disclosure has peel force from glass of at least 1 Newtons per decimeter (N/dm), or at least 2 N/dm, per the Method for Peel Adhesion Measurement detailed in the Examples Section. In certain embodiments, a curable silsesquioxane polymer of the present disclosure has peel force from glass of no greater than 6 N/dm, per the Method for Peel Adhesion Measurement detailed in the Examples Section.

Such curable silsesquioxane polymers can be combined with a photoinitiator and UV cured. Suitable photoinitiators include a variety of free-radical photoinitiators. Exemplary free-radical photoinitiators can be selected from benzophenone, 4-methylbenzophenone, benzoyl benzoate, phenylacetophenones, 2,2-dimethoxy-2-phenylacetophenone, alpha, alpha-diethoxyacetophenone, 1-hydroxy-cyclohexyl-phenyl-ketone (available under the trade designation IRGACURE 184 from BASF Corp., Florham Park, N.J.), 2-hydroxy-2-methyl-1-phenylpropan-1-one, bis-(2,6-dimethoxybenzoyl)-2,4,4-trimethylpentyl phosphine oxide, 2-hydroxy-2-methyl-1-phenylpropan-1-one, 2-hydroxy-2-methyl-1-phenylpropan-1-one (available under the trade designation DAROCURE 1173 from BASF Corp.), 2,4,6-trimethylbenzoyl-diphenylphosphine oxide, and combinations thereof (e.g., a 50:50 by wt. mixture of 2,4,6-trimethylbenzoyl-diphenylphosphine oxide and 2-hydroxy-2-methyl-1-phenylpropan-1-one, available under the trade designation DAROCURE 4265 from BASF Corp.).

A photoinitiator is typically present in a coating composition in an amount of at least 0.01 percent by weight (wt-%), based on the total weight of curable material in the coating composition. A photoinitiator is typically present in a coating composition in an amount of no greater than 5 wt-%, based on the total weight of curable material in the coating composition.

Such curable silsesquioxane polymers can be combined with nanoparticles that can impart hardness to a coating. Suitable nanoparticles of the present disclosure include an inorganic oxide. Exemplary nanoparticle can include an oxide of a non-metal, an oxide of a metal, or combinations thereof. An oxide of a non-metal includes an oxide of, for example, silicon or germanium. An oxide of a metal includes an oxide of, for example, iron, titanium, cerium, aluminum, zirconium, vanadium, zinc, antimony, and tin. A combination of a metal and non-metal oxide includes an oxide of aluminum and silicon.

The nanoparticle can have an average particle size of no greater than 100 nanometers (nm), no greater than 75 nanometers, no greater than 50 nanometers, no greater than 25 nanometers, no greater than 20 nanometers, no greater than 15 nanometers, or no greater than 10 nanometers. The nanoparticle can have an average particle size of at least 1 nanometer, at least 5 nanometers, at least 15 nanometers, at least 20 nanometers, at least 25 nanometers, at least 50 nanometers, or at least 75 nanometers.

Various nanoparticles are commercially available. Commercial sources of nanoparticles are available from Nyacol Co., Ashland, Mass., Solvay-Rhodia (Lyon, France), and Nalco Co., Naperville, Ill. Nanoparticles can also be made using techniques known in the art. For example, zirconia nanoparticles can be prepared using hydrothermal technology, as described for example in PCT Publication No. WO2009/085926 (Kolb et al.). Suitable zirconia nanoparticles are also those described in, for example, U.S. Pat. No. 7,241,437 (Davidson, et al.).

In some embodiments, the nanoparticles may be in the form of a colloidal dispersion. Colloidal silica nanoparticles in a polar solvent are particularly desirable. Silica sols in a polar solvent such as isopropanol are available commercially under the trade names ORGANOSILICASOL IPA-ST-ZL, ORGANOSILICASOL IPA-ST-L, and ORGANOSILICASOL IPA-ST from Nissan Chemical Industries, Ltd., Chiyoda-Ku Tokyo, Japan.

Preferably, the nanoparticles are dispersed in a curable coating composition of the present disclosure. If used, nanoparticles are typically present in a curable coating composition in an amount of at least 5 wt-%, based on the total weight of the composition. If used, nanoparticles are typically present in a curable coating composition in an amount of no greater than 80 wt-%, or no greater than 50 wt-%, based on the total weight of the composition. Depending on the particle size of the nanoparticles and the amount of nanoparticles added, certain compositions may be hazy. For example, a composition that includes over 50 wt-% of 10 nanometer nanoparticles may be hazy, but such composition can be useful for certain applications.

A coating composition that includes a curable silsesquioxane polymer, a photoinitiator, and optional nanoparticles, can also include an optional organic solvent, if desired. Useful solvents for the coating compositions include those in which the compound is soluble at the level desired. Typically, such organic solvent is a polar organic solvent. Exemplary useful polar solvents include, but are not limited to, ethanol, isopropanol, methyl ethyl ketone, methyl isobutyl ketone, dimethylformamide, and tetrahydrofuran. These solvents can be used alone or as mixtures thereof.

Any amount of the optional organic solvent can be used. For example, the curable coating compositions can include up to 50 wt-% or even more of organic solvent. The solvent can be added to provide the desired viscosity to the coating composition. In some embodiments, no solvent or only low levels (e.g., up to 10 wt-%) of organic solvent is used in the curable coating composition.

The coating composition is typically a homogeneous mixture (e.g., of just the curable silsesquioxane polymer and photoinitiator) that has a viscosity appropriate to the application conditions and method. For example, a material to be brush or roller coated would likely be preferred to have a higher viscosity than a dip coating composition. Typically, a coating composition includes at least 5 wt-%, of the polymer, based on the total weight of the coating composition. A coating composition often includes no greater than 80 wt-%, of the polymer, based on the total weight of the coating composition.

A wide variety of coating methods can be used to apply a composition of the present disclosure, such as brushing, spraying, dipping, rolling, spreading, and the like. Other coating methods can also be used, particularly if no solvent is included in the coating composition. Such methods include knife coating, gravure coating, die coating, and extrusion coating, for example.

A curable coating composition of the present disclosure can be applied in a continuous or patterned layer. Such layer can be disposed on at least a portion of at least one surface of the substrate. If the curable composition includes an organic solvent, the coated curable composition can be exposed to conditions that allow the organic solvent to evaporate from the curable composition before UV curing the curable composition. Such conditions include, for example, exposing the composition to room temperature, or an elevated temperature (e.g., 60° C. to 70° C.).

Curing of a curable composition of the present disclosure occurs using UV radiation. Typically, the curing occurs for a time effective to render the coating sufficiently non-tacky to the touch.

An exemplary UV-cured silsesquioxane polymer of the present disclosure has the following three-dimensional branched network structure (with residual R (e.g., vinyl) groups):

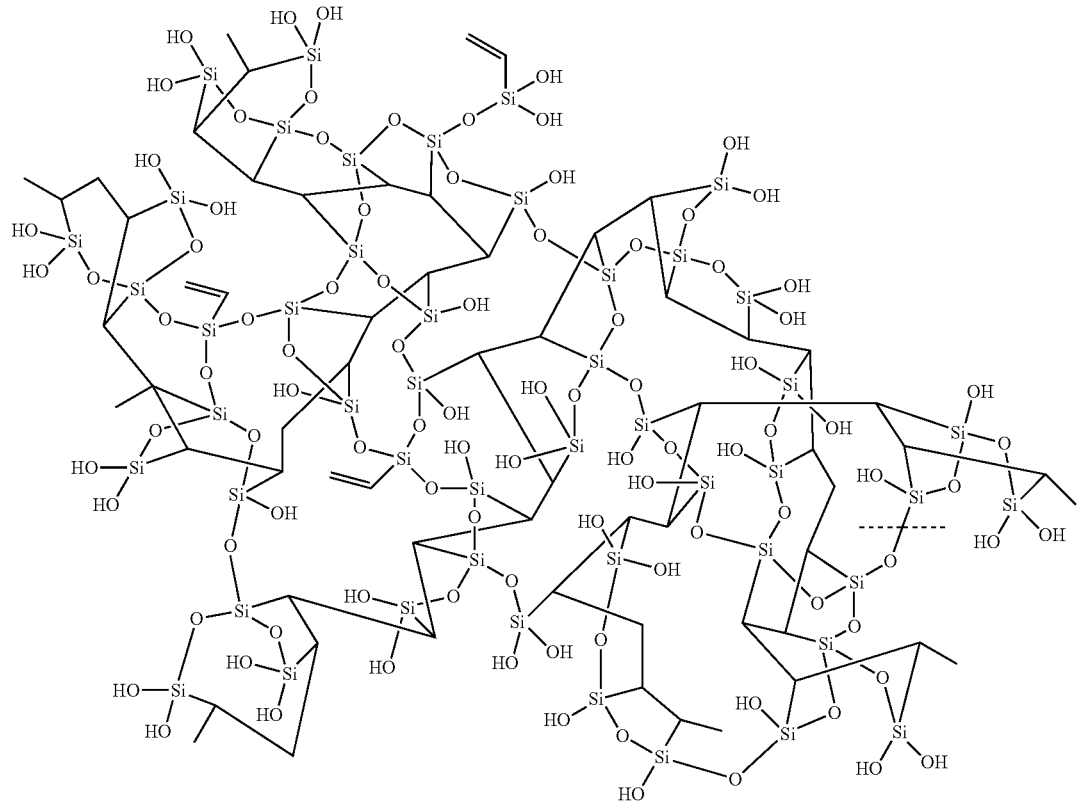

Illustrative Embodiments

1. A curable silsesquioxane polymer comprising a three-dimensional branched network having the formula:

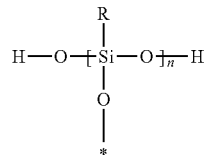

wherein:

the oxygen atom at the * is bonded to another Si atom within the three-dimensional branched network;

R is an organic group comprising an ethylenically unsaturated group;

n is an integer of greater than 3; and

The substrate on which the coating can be disposed can be any of a wide variety of hard or flexible materials. Useful substrates include ceramics, siliceous substrates including glass, metal, natural and man-made stone, and polymeric materials, including thermoplastics and thermosets. Suitable materials include, for example, poly(meth)acrylates, polycarbonates, polystyrenes, styrene copolymers such as styrene acrylonitrile copolymers, polyesters, polyethylene terephthalate.

The following is a list of illustrative embodiments of the present disclosure.

the —OH groups are present in an amount of at least 15 wt-% of the polymer.

2. The curable silsesquioxane polymer of embodiment 1 wherein the —OH groups are present in an amount of at least 20 wt-% of the polymer.

3. The curable silsesquioxane polymer of embodiment 1 or 2 wherein the —OH groups are present in an amount of no greater than 60 wt-% of the polymer.

4. The curable silsesquioxane polymer of embodiment 3 wherein the —OH groups are present in an amount of no greater than 50 wt-% of the polymer.

5. The curable silsesquioxane polymer of embodiment 4 wherein the —OH groups are present in an amount of no greater than 30 wt-% of the polymer.

6. The curable silsesquioxane polymer of any one of embodiments 1 through 5 wherein n is an integer of at least 10.

7. The curable silsesquioxane polymer of any one of embodiments 1 through 6 wherein n is an integer of no greater than 100.

8. The curable silsesquioxane polymer of embodiment 7 wherein n is an integer of no greater than 25.

9. The curable silsesquioxane polymer of any one of embodiments 1 through 8 wherein R has the formula —Y—Z, wherein Y is a bond, an alkylene group, an arylene group, or a combination thereof, and Z is an ethylenically unsaturated group selected from a vinyl group, a vinylether group, a (meth)acryloyloxy group, and a (meth)acryloylamino group (including embodiments wherein the nitrogen is optionally substituted with methyl or ethyl).

10. The curable silsesquioxane polymer of embodiment 9 wherein Y is a bond, a (C1-C20)alkylene group, a (C6-C12) arylene group, a (C6-C12)alk(C1-C20)arylene group, a (C6-C12)ar(C1-C20)alkylene group, or a combination thereof.

11. The curable silsesquioxane polymer of embodiment 9 or 10 wherein Z is a vinyl group.

12. The curable silsesquioxane polymer of any one of embodiments 1 through 11 which has peel force from glass of at least 1 N/dm.

13. The curable silsesquioxane polymer of embodiment 12 which has peel force from glass of at least 2 N/dm.

14. The curable silsesquioxane polymer of any one of embodiments 1 through 13 which has peel force from glass of no greater than 6 N/dm.

15. A curable silsesquioxane polymer comprising a three-dimensional branched network which is a condensation reaction product of a compound having the formula Z—Y—Si($R^1$)$_3$, wherein:

Y is a bond, an alkylene group, an arylene group, or a combination thereof;

Z is an ethylenically unsaturated group selected from a vinyl group, a vinylether group, a (meth)acryloyloxy group, and a (meth)acryloylamino group (including embodiments wherein the nitrogen is optionally substituted with methyl or ethyl); and each $R^1$ group is independently a hydrolyzable group;

wherein the polymer includes —OH groups in an amount of at least 15 wt-% of the polymer.

16. The curable silsesquioxane polymer of embodiment 15 wherein Y is a bond, a (C1-C20)alkylene group, a (C6-C12) arylene group, a (C6-C12)alk(C1-C20)arylene group, a (C6-C12)ar(C1-C20)alkylene group, or a combination thereof.

17. The curable silsesquioxane polymer of embodiment 15 or 16 wherein Z is a vinyl group.

18. The curable silsesquioxane polymer of any one of embodiments 15 through 17 wherein the hydrolyzable group is selected from an alkoxy, aryloxy, aralkyloxy, alkaryloxy, acyloxy, and halo.

19. The curable silsesquioxane polymer of embodiment 18 wherein the hydrolyzable group is an alkoxy group.

20. The curable silsesquioxane polymer of any one of embodiments 15 through 19 wherein the —OH groups are present in an amount of at least 20 wt-% of the polymer.

21. The curable silsesquioxane polymer of any one of embodiments 15 through 20 wherein the —OH groups are present in an amount of no greater than 60 wt-% of the polymer.

22. The curable silsesquioxane polymer of embodiment 21 wherein the —OH groups are present in an amount of no greater than 50 wt-% of the polymer.

23. The curable silsesquioxane polymer of embodiment 22 wherein the —OH groups are present in an amount of no greater than 30 wt-% of the polymer.

24. The curable silsesquioxane polymer of any one of embodiments 15 through 23 which has peel force from glass of at least 1 N/dm.

25. The curable silsesquioxane polymer of embodiment 24 which has peel force from glass of at least 2 N/dm.

26. The curable silsesquioxane polymer of any one of embodiments 15 through 25 which has peel force from glass of no greater than 6 N/dm.

27. A curable composition comprising a photoinitiator and the curable silsesquioxane polymer of any one of embodiments 1 through 26.

28. The curable composition of embodiment 27 wherein the photoinitiator is a free-radical photoinitiator.

29. The curable composition of embodiment 28 wherein the free-radical photoinitiator is selected from benzophenone, 4-methylbenzophenone, benzoyl benzoate, phenylacetophenones, 2,2-dimethoxy-2-phenylacetophenone, alpha,alpha-diethoxyacetophenone, hydroxycyclo-hexylphenylketone, 2-hydroxy-2-methyl-1-phenylpropan-1-one, bis-(2,6-dimethoxybenzoyl)-2,4,4-trimethylpentyl phosphine oxide, 2-hydroxy-2-methyl-1-phenylpropan-1-one, 2-hydroxy-2-methyl-1-phenylpropan-1-one, 2,4,6-trimethylbenzoyl-diphenylphosphine oxide, and combinations thereof.

30. The curable composition of any one of embodiments 27 through 29 further comprising nanoparticles.

31. The curable composition of embodiment 30 wherein the nanoparticles comprise silica nanoparticles.

32. The curable composition of any one of embodiments 27 through 31 further comprising an organic solvent.

33. The curable composition of embodiment 32 wherein the organic solvent is a polar solvent.

34. The curable composition of embodiment 33 wherein the polar organic solvent comprises isopropanol, methyl ethyl ketone, methyl isobutyl alcohol, ethanol, tetrahydrofuran, dimethylformamide, or combinations thereof.

35. An article comprising a substrate and the curable composition of any one of embodiments 27 through 34 in a layer disposed on at least a portion of at least one surface of the substrate.

36. The article of embodiment 35 wherein the layer is patterned.

37. An article comprising a substrate and a cured coating layer prepared by UV curing the composition of any one of embodiments 27 through 34 disposed on at least a portion of at least one surface of the substrate.

38. The article of embodiment 37 wherein the layer is patterned.

39. A method of making a cured coating on a substrate surface, the method comprising:

coating a curable composition of any one of embodiments 27 through 34 on at least a portion of at least one substrate surface;

optionally exposing the coated curable composition to conditions that allow an organic solvent, if present, to evaporate from the curable composition; and UV curing the curable composition.

40. The method of embodiment 39 wherein the curable silsesquioxane polymer is prepared by a method comprising subjecting a compound of the formula Z—Y—Si($R^1$)$_3$ to a condensation reaction;

wherein:
Y is a bond, an alkylene group, an arylene group, or a combination thereof;
Z is an ethylenically unsaturated group selected from a vinyl group, a vinylether group, a (meth)acryloyloxy group, and a (meth)acryloylamino group (including embodiments wherein the nitrogen is optionally substituted with methyl or ethyl); and
each $R^1$ group is independently a hydrolyzable group;
wherein the polymer includes —OH groups in an amount of at least 15 wt-% of the polymer.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Materials

Unless otherwise noted, all parts, percentages, ratios, etc., in the examples and in the remainder of the specification are by weight. Unless otherwise noted, all chemicals were obtained or are available from, chemical suppliers such as Aldrich Chemical Company, Milwaukee, Wis.

| Designation | Description | Supplier |
|---|---|---|
| MONOMER-1 | Vinyltriethoxysilane | Gelest, Inc., Morrisville, PA |
| MONOMER-2 | Allyltriethoxysilane | |
| MONOMER-3 | Allylphenylpropyltriethoxysilane | |
| MONOMER-4 | 3-Butenyltriethoxysilane | |
| MONOMER-5 | Docosenyltriethoxysilane | |
| MONOMER-6 | Hexenyltriethoxysilane | |
| "IRGACURE 184" | 1-Hydroxy-cyclohexyl-phenyl-ketone | BASF Corporation, Florham Park, NJ |
| "DAROCURE 1173" | 2-Hydroxy-2-methyl-1-phenylpropan-1-one | |
| "DAROCURE 4265" | 50:50 by wt. mixture of 2,4,6-Trimethylbenzoyl-diphenylphosphine oxide and 2-hydroxy-2-methyl-1-phenylpropan-1-one | |
| "IPA-ST-ZL" | Colloidal silica sol, 70-100 nm particle size, 30 wt-% in IPA commercially available under trade designation "ORGANOSILICASOL IPA-ST-ZL" | Nissan Chemical Industries, Ltd., Chiyoda-Ku Tokyo, Japan |
| "IPA-ST-L" | Colloidal silica sol, 40-50 nm particle size, 30 wt-% in IPA commercially available under trade designation "ORGANOSILICASOL IPA-ST-L" | |
| "IPA-ST" | Colloidal silica sol, 10-15 nm particle size, 30 wt-% in IPA commercially available under trade designation "ORGANOSILICASOL IPA-ST" | |
| MEK | Methyl ethyl ketone | Sigma-Aldrich Chemical Company, St. Louis, MO |
| IPA | Isopropanol | |
| 3SAB PET | 2-mil (0.058 millimeter (mm)) thick polyester terephthalate (PET) film, which has one side chemically treated or primed to improve the adhesion of silicone coatings, commercially available under the trade designation "HOSTAPHAN 3SAB" | Mitsubishi Polyester Film, Greer, SC |

Test Methods

Method for Peel Adhesion Measurement

Poly(vinylsilsesquioxane) (50 wt-% solution in methyl ethyl ketone) samples prepared according to EX1 and CE1, described below, were coated on 3SAB PET films using a knife coater to provide a dry coating having a thickness of 2-3 mil (0.058-0.076 mm). The coated PET films were placed in a forced air drying oven maintained at 70° C. (for 2 minutes) to evaporate the solvent. After drying, the coated PET films were cut into samples for measuring peel adhesion according to the method described below.

Peel adhesion of EX1 and CE1 samples was then measured with an IMASS SP-2000 peel tester (obtained from IMASS, Inc., Accord, Mass.) using 0.5 inch by 5 inch (about 1.25 cm by 12.7 cm) samples. The samples were applied to a clean glass panel using four total passes of a 2 kg-rubber roller. Prior to testing, the samples were allowed to dwell for 20 minutes at room temperature and 50 percent relative humidity. The panel was then mounted on the IMASS SP-2000 peel tester, and the samples were pulled off of the panel at a 90 degree angle at a speed of 30.48 cm/minute. Peel force was measured in units of ounces per inch (oz/inch) and was used to calculate the average peel force for a minimum of three samples and was then converted to Newtons per decimeter (N/dm).

Procedure for the Calculation of (%) OH Groups by FTIR

The amount of —OH groups present in the samples prepared according to the EX1 and CE1, described below, was determined as follows. About 0.1 g of poly(vinylsilsesquioxane) was applied as uniform thin layer directly on to a dried potassium bromide pellet and thereafter directly was analyzed by Fourier Transform Infrared Spectroscopy (FTIR), (Model Nicolet 6700 FTIR, from Thermo Fisher Scientific, Madison, Wis.). Using integration software ("OMNIC" software version 7.3, obtained from Thermo Fisher Scientific, Madison, Wis.), the total peak area from 500 $cm^{-1}$ to 4000 $cm^{-1}$ was calculated along with the area of the broad —OH absorbance peak from 3100 to 3600 $cm^{-1}$. The % OH was calculated by taking area of the —OH absorbance peak versus the total peak area.

Method for Pencil Hardness

ASTM D3363-05(2011)e2 "Standard Test Method for Film Hardness by Pencil Test" (available from ASTM International, West Conshohocken, Pa.) was used to ascertain the hardness of the cured films prepared according to the examples and comparative examples described below. Apparatus used in this study was ELCOMETER 3086 Scratch Boy (obtained from Elcometer Instruments Limited, MI). Pencil hardness was measured by moving a pencil of a designated hardness grade (i.e., 9B, 8B, 7B, 6B, 5B, 4B, 3B, 2B, B, HB, F, H, 2H, 3H, 4H, 5H, 6H, 7H, 8H, 9H, from the softest grade to hardest grade pencil), and thereafter looking at the surface under a microscope to find if the surface was scratched. The sample was designated a hardness value corresponding to the hardest pencil that did not microscopically scratch the surface of the sample.

Examples 1-6 (EX1-EX6) and Comparative Example 1 (CE1)

For CE1, MONOMER 1 (100 g), DI water (50 g), and oxalic acid (0.5 g) were mixed together at room temperature in a 500 mL round bottom flask equipped with a condenser. The mixture was stirred at 70° C. for 24 hours followed by the partial evaporation of the solvents (water/ethanol mixture). The resulting solid was washed three-times with DI water (100 mL). After washing, the MEK was evaporated under reduced pressure to yield highly cross-linked polyvinylsilsesquioxane.

For EX1, MONOMER 1(100 g), distilled (DI) water (50 g), and oxalic acid (0.5 g) were mixed together at room temperature in a 500 mL round bottom flask equipped with a condenser. The mixture was stirred at room temperature for 6-8 hours followed by the evaporation of the solvents (water/ethanol mixture). The resulting liquid was dissolved in MEK (100 mL) and washed three-times with DI water (100 mL). After washing, the MEK was evaporated under reduced pressure to yield polymer product polyvinylsilsesquioxane as a viscous liquid.

EX2-EX6 polymers were prepared in the same manner as EX1, using their respective monomers listed in Table 1, below.

TABLE 1

| Example | Monomer | Polymer |
|---------|---------|---------|
| EX2 | MONOMER-2 | Poly(allylsilsesquioxane) |
| EX3 | MONOMER-3 | Poly(allylphenylpropylsilsesquioxane) |
| EX4 | MONOMER-4 | Poly(3-butenylsilsesquioxane) |
| EX5 | MONOMER-5 | Poly(docosenylsilsesquioxane) |
| EX6 | MONOMER-6 | Hexenylsilsesquioxane |

EX1 and CE1 samples were tested to determine the % (—OH) groups present as well as the average peel adhesion using the methods described above. The data is presented in Table 2, below.

TABLE 2

| Example | Average Peel Adhesion (N/dm) | % (—OH) |
|---------|-------------------------------|---------|
| EX1 | 4.36 | 25.6 |
| CE1 | 0.10 | 11.7 |

Example 7-(EX7)

Poly(vinylsilsesquioxane) (30 g), prepared above in EX1, was dissolved in 100 g of IPA:MEK (70:30 by wt.) mixture followed by the addition of IRGACURE 184 (0.3 g). Using #8 Mayer Rod, the mixture was then coated on a 3 SAB PET film. The coated film was passed through a "LIGHT HAMMER 6" UV-chamber (obtained from Fusion UV Systems, Inc. Gaithersburg, Md., under trade designation "LIGHT HAMMER 6") equipped with an H-bulb located at 5.3 cm above sample at 12 meters/minute to cure the coating. The coating was cured to touch and adhered well to PET film. The pencil hardness of the cured EX7 sample determined using the method described above was 3H.

Examples 8-11 (EX8-EX11)

EX8-EX11 were prepared in the same manner as EX7, except that the polysilsesquioxane and the photoinitiator were varied as summarized in Table 3, below. The EX8-EX11 samples were cured to touch and adhered well to PET film. The pencil hardness of the cured EX8 and EX9 samples was 2H.

TABLE 3

| Example | Polysilsesquioxane | Photoinitiator | Pencil Hardness |
|---------|---------------------|----------------|-----------------|
| EX8 | EX2 | IRGACURE 184 | 3H |
| EX9 | EX3 | IRGACURE 184 | 3H |
| EX10 | EX1 | DAROCURE 1173 | 3H |
| EX11 | EX1 | DAROCURE 4265 | 3H |

Examples 12-14 (EX12-EX14)

EX12-EX14 were prepared in the same manner as EX7, except that the corresponding coating mixtures further contained 40 g of IPA-ST-L, 60 g of IPA-ST, and 10 g of IPA-ST-ZL silica sol, respectively. The EX12-EX14 samples were cured to touch and adhered well to PET film.

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A method of making a cured coating on a substrate surface, the method comprising:
   i) providing a curable composition consisting of a curable silsesquioxane polymer, optionally organic solvent, and optionally photoinitiator; wherein the curable silsesquioxane polymer comprises a three-dimensional branched network having the formula:

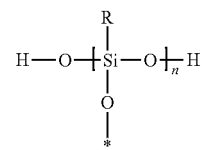

wherein:
   the oxygen atom at the * is bonded to another Si atom within the three-dimensional branched network;
   R is an organic group comprising an ethylenically unsaturated group;
   n is an integer of greater than 3; and
   the OH groups are present in an amount of at least 15 wt-% of the polymer;
   ii) coating the curable composition on at least a portion of at least one substrate surface;
   iii) optionally exposing the coated curable composition to conditions that allow organic solvent, when present, to evaporate from the curable composition; and
   iv) UV curing the curable composition.

2. The method of claim 1 wherein the OH groups are present in an amount of no greater than 60 wt-% of the polymer.

3. The method of claim 1 wherein n is an integer of no greater than 100.

4. The method of claim 1 wherein R has the formula —Y—Z, wherein Y is a bond, an alkylene group, an arylene group, or a combination thereof, and Z is an ethylenically unsaturated group selected from a vinyl group, a vinylether group, a (meth)acryloyloxy group, and a (meth)acryloylamino group.

5. The method of claim 4 wherein Y is a bond, a (C1-C20)alkylene group, a (C6-C12)arylene group, a (C6-C12)alk(C1-C20)arylene group, a (C6-C12)ar(C1-C20)alkylene group, or a combination thereof.

6. The method of claim 1 which has peel force from glass of at least 1 N/dm.

7. The method of claim 1 wherein the curable silsesquioxane polymer consists of a three-dimensional branched network which is a condensation reaction product of a compound or compounds having the formula Z—Y—Si($R^1$)$_3$, wherein:
Y is a bond, an alkylene group, an arylene group, or a combination thereof;
Z is an ethylenically unsaturated group selected from a vinyl group, a vinylether group, a (meth)acryloyloxy group, and a (meth)acryloylamino group; and
each $R^1$ group is independently a hydrolyzable group; wherein the polymer includes —OH groups in an amount of at least 15 wt-% of the polymer.

8. The method of claim 7 wherein Y is a bond, a (C1-C20)alkylene group, a (C6-C12)arylene group, a (C6-C12)alk(C1-C20)arylene group, a (C6-C12)ar(C1-C20)alkylene group, or a combination thereof.

\* \* \* \* \*